(12) United States Patent
Booth et al.

(10) Patent No.: US 9,940,261 B2
(45) Date of Patent: Apr. 10, 2018

(54) ZONING OF LOGICAL TO PHYSICAL DATA ADDRESS TRANSLATION TABLES WITH PARALLELIZED LOG LIST REPLAY

(71) Applicant: HGST Netherlands B.V., Amsterdam (NL)

(72) Inventors: Jing Shi Booth, San Jose, CA (US); Jerry Lo, Hacienda Heights, CA (US); Subhash Balakrishna Pillai, Irvine, CA (US)

(73) Assignee: Western Digital Technology, Inc., San Jose, CA (US)

( * ) Notice: Subject to any disclaimer, the term of this patent is extended or adjusted under 35 U.S.C. 154(b) by 0 days.

(21) Appl. No.: 15/147,465

(22) Filed: May 5, 2016

(65) Prior Publication Data

US 2017/0322888 A1 Nov. 9, 2017

(51) Int. Cl.
*G06F 12/02* (2006.01)
*G06F 12/1009* (2016.01)
*G06F 9/52* (2006.01)
*G06F 3/06* (2006.01)

(52) U.S. Cl.
CPC .......... *G06F 12/1009* (2013.01); *G06F 3/065* (2013.01); *G06F 3/0607* (2013.01); *G06F 3/0688* (2013.01); *G06F 9/526* (2013.01); *G06F 12/0246* (2013.01); *G06F 2212/651* (2013.01); *G06F 2212/7201* (2013.01)

(58) Field of Classification Search
CPC ...... G06F 3/065; G06F 3/0688; G06F 3/0607; G06F 12/0246
USPC .......................................................... 711/103
See application file for complete search history.

(56) References Cited

U.S. PATENT DOCUMENTS

| 7,941,692 | B2 | 5/2011 | Royer et al. |
| 7,979,626 | B2 * | 7/2011 | Rogers ............... G06F 11/1441 711/103 |
| 8,028,120 | B2 | 9/2011 | Mo et al. |
| 8,037,112 | B2 * | 10/2011 | Nath ................ G06F 17/30327 707/813 |
| 8,555,086 | B2 | 10/2013 | Royer et al. |
| 8,838,936 | B1 | 9/2014 | Salessi et al. |
| 8,909,851 | B2 | 12/2014 | Jones et al. |

(Continued)

FOREIGN PATENT DOCUMENTS

| CN | 102043721 A | 5/2011 | |
| WO | WO-2009045010 A2 * | 4/2009 | ......... G06F 12/0246 |

*Primary Examiner* — Pierre Miche Bataille
(74) *Attorney, Agent, or Firm* — McDermott Will & Emery LLP

(57) ABSTRACT

An example device includes a memory device and one or more processors. The memory device is configured to store a table that includes two or more mappings, each mapping being associated with a respective logical address and a respective physical address. The processors are configured to identify, within the table, a first zone and a second zone. Each zone includes one or more mappings of the table. The zones do not share any mapping of the table. The processors are further configured to form a first log list indicating one or more mapping updates associated with the mapping(s) included in the first zone, to form a second log list indicating one or more mapping updates associated with the mapping(s) included in the second zone, and to replay a portion of the first log list and a portion of the second log list concurrently to update the table.

20 Claims, 10 Drawing Sheets

(56) References Cited

U.S. PATENT DOCUMENTS

| | | |
|---|---|---|
| 9,037,820 B2 | 5/2015 | Ratn et al. |
| 9,058,255 B2 | 6/2015 | Huang |
| 2014/0082265 A1* | 3/2014 | Cheng ................ G06F 12/0246 711/103 |
| 2015/0339060 A1* | 11/2015 | Shin ..................... G06F 3/0608 711/162 |

\* cited by examiner

ZONING OF LOGICAL TO PHYSICAL DATA ADDRESS TRANSLATION TABLES WITH PARALLELIZED LOG LIST REPLAY

TECHNICAL FIELD

This disclosure generally relates to mapping of logical data addresses to physical data addresses.

BACKGROUND

Storage devices used in computers or other electronics devices may include one or both of non-volatile memory or volatile memory. Non-volatile memory enables data storage in cases of power loss, whether the power loss is planned or unplanned. As a result, non-volatile memory devices have developed into a popular type of memory for a wide range of electronic applications. For instance, non-volatile memory devices, including flash memory devices, are commonly incorporated into solid-state storage devices, such as solid-state drives (SSDs).

Some storage devices utilize physical data addresses for internal mapping of data to storage locations. For example, SSDs may utilize physical block addresses, such as NAND physical address units within the storage components of the SSD, to specify locations of data within the SSD. Operating systems, however, may use logical data addresses to specify logical information to represent the storage locations of data. To accurately locate data based on logical location information understandable to the operating system, a controller of an SSD may maintain a logical-to-physical data address translation table, referred to herein as an "L2P" table. The L2P table associates each logical data address used by the operating system with a respective physical block address used internally by the controller of the SSD. The SSD controller may also maintain a log list that dynamically chronicles updates to the various logical-to-physical address mappings in the L2P table. For instance, the dynamic log list may include previously-implemented updates to the L2P table. In addition, the dynamic log list may include pending updates that are to be implemented with respect to the L2P table in the future.

SUMMARY

In some examples, the disclosure describes a method. The method includes forming, by a processor, a table that includes two or more mappings, each mapping being associated with a respective logical address and a respective physical address of a data storage device, and identifying, by the processor, a plurality of logical zones including a first logical zone within the table and a second logical zone within the table, where each of the first logical zone and second logical zone includes one or more mappings of the table, and where the one or more mappings of the first logical zone are mutually exclusive with respect to the one or more mappings of the second logical zone. The method may further include forming, by the processor, a first log list associated with the first logical zone, the first log list indicating one or more mapping updates associated with the one or more mappings included in the first logical zone, and forming, by the processor, a second log list associated with the second logical zone, the second log list indicating one or more mapping updates associated with the one or more mappings included in the second logical zone. The method may also include replaying, by the processor, a portion of the first log list and a portion of the second log list concurrently to update the table.

In some examples, the disclosure describes a storage device that includes a device that includes a memory device and one or more processors. The memory device is configured to store a table that includes two or more mappings, each mapping being associated with a respective logical address and a respective physical address of a data storage device. The one or more processors are configured to identify a plurality of logical zones including a first logical zone within the table and a second logical zone within the table, where each of the first logical zone and second logical zone includes one or more mappings of the table, and where the one or more mappings of the first logical zone are mutually exclusive with respect to the one or more mappings of the second logical zone. The processor(s) may be further configured to form a first log list associated with the first logical zone, the first log list indicating one or more mapping updates associated with the one or more mappings included in the first logical zone, and to form a second log list associated with the second logical zone, the second log list indicating one or more mapping updates associated with the one or more mappings included in the second logical zone. The processor(s) may also be configured to replay a portion of the first log list and a portion of the second log list concurrently to update the table.

In some examples, the disclosure describes a non-transitory computer-readable storage medium encoded with instructions. The instructions, when executed, cause one or more processors of a computing device to form a table that includes two or more mappings, each mapping being associated with a respective logical address and a respective physical address of a data storage device, and to identify a plurality of logical zones including a first logical zone within the table and a second logical zone within the table, where each of the first logical zone and second logical zone includes one or more mappings of the table, and where the one or more mappings of the first logical zone are mutually exclusive with respect to the one or more mappings of the second logical zone. The non-transitory computer-readable storage medium may be further encoded with instructions that, when executed, cause the one or more processors of the computing device to form a first log list associated with the first logical zone, the first log list indicating one or more mapping updates associated with the one or more mappings included in the first logical zone, and to form a second log list associated with the second logical zone, the second log list indicating one or more mapping updates associated with the one or more mappings included in the second logical zone. The non-transitory computer-readable storage medium may also be encoded with instructions that, when executed, cause the one or more processors of the computing device to replay a portion of the first log list and a portion of the second log list concurrently to update the table.

The details of one or more examples are set forth in the accompanying drawings and the description below. Other features, objects, and advantages will be apparent from the description and accompanying drawings, and from the claims.

DETAILED DESCRIPTION

Figure 1:
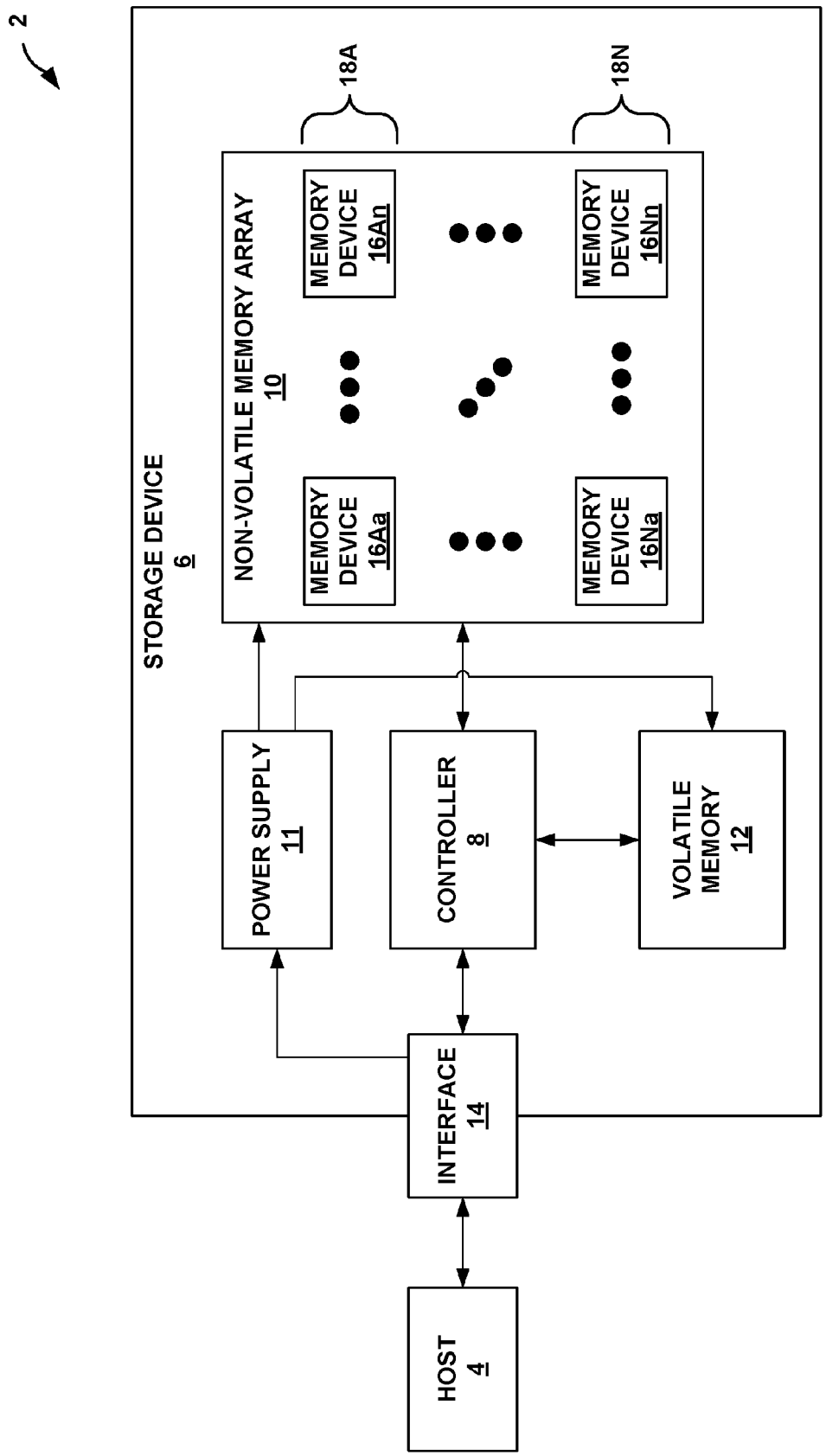
FIG. 1 is a conceptual and schematic block diagram illustrating an example storage environment in which a storage device may function as a storage device for a host device, in accordance with one or more aspects of this disclosure.

This disclosure is generally directed to systems and techniques for reducing the time expended in stepping through or "replaying" a log list at power-up of a data storage device. In various use cases, a data storage device controller or a processor of the controller may implement aspects of this disclosure to take advantage of multi-core processing to parallelize the log list replaying at power-up. For instance, a controller configured according to aspects of this disclosure may divide the L2P table into multiple logical "zones." In turn, at power-up, multiple processors or processing cores of the controller may replay the log list for multiple logical zones in parallel. As storage capacity of data storage devices such as SSDs has been increasing, L2P table also increase in size. As the L2P size increases, the replay or "journaling" process for updating the L2P tables at power-up is also becoming increasingly time consuming and resource-intensive.

The L2P table logical zoning and parallelized log list replay techniques of this disclosure provide several potential advantages by enhancing existing data storage device power-up mechanisms. For instance, by journaling multiple zones of the L2P table in parallel, the data storage device controller may reduce the power-up time currently required by existing data storage device technology. As another example, the controller may more evenly distribute the resource consumption of the journaling process across multiple cores, thereby reducing the load on any single core over a particular time slice or interval. In this way, a data storage device controller configured according to aspects of this disclosure may utilize increasingly available multi-core processing technology to improve the distribution of resource-usage and to mitigate the power-up time for the data storage device. In other words, the techniques of this disclosure enable the data storage device controller to exploit multi-core processors, which are becoming more prevalent in commercially-available computing devices.

Previously-proposed techniques for reducing power-up time have relied on partitioning a SSD into multiple virtual drives or "entities." Partitioning of the SSD may potentially yield a reduced power-up time based on the reduced storage capacity of each partitioned entity. However, in cases of partitioned SSDs, the SSD controller(s) manage each partitioned entity within a closed universe. Thus, a partitioned SSD may hinder or prevent the controller(s) from performing certain maintenance operations, such as so-called "garbage collection" and/or "wear leveling" on an SSD-wide (or "global") basis. Instead, any additional resources that can be drawn upon for the maintenance operations need to reside locally within the smaller partitioned entity, in accordance with these previously-proposed techniques.

In contrast, the logical zoning and parallelized replay techniques of this disclosure enable the data storage device controller(s) to mitigate power-up time and leverage multi-core processing without compromising global garbage collection and wear leveling across the entire data storage device. It will be appreciated that a data storage device controller configured according to the aspects of this disclosure may zone an L2P table without partitioning the L2P table into separate, free-standing tables or logically partitioning the storage devices themselves. For instance, the data storage device controller may demarcate multiple zones of the L2P table from one another, while maintaining the monolithic or unified nature of the overall L2P table itself. Thus, the controller can still draw upon any physical storage or other resource within the overall SSD to perform garbage collection and wear leveling in accordance with this disclosure. In this way, the table logical zoning and parallelized journaling techniques of this disclosure enable the controller to improve the power-up process from a time and clock cycle consumption standpoint, while maintaining the advantages of global garbage collection and wear leveling.

In accordance with one or more techniques of this disclosure, a controller of a data storage device may logically zone the L2P table based on various logical address grouping schemes. According to some implementations, the controller may form a logical zone by grouping logical data addresses that are in sequential order, ranging from a pre-determined floor value to a pre-determined ceiling value. According to other implementations, the controller may for a zone by selecting every "Nth" logical address in sequential order. In an example where N=4, the controller may place logical addresses with indexes 0 and 4 in a first zone, logical addresses indexed 1 and 5 in a second zone, and so on. The former implementation is referred to herein as a "ranging" or "serial" implementation, while the latter is referred to as an "interleaving" or "interleaved" implementation. The aspects of this disclosure are discussed below with respect to the accompanying drawings.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, wherein the plurality of storage devices may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Host device 4 may identify data stored in storage environment 2 using logical or virtual addresses.

As illustrated in FIG. 1 storage device 6 may include controller 8, non-volatile memory array 10 (NVMA 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6; and the like. In some examples, the physical dimensions and connector configurations of storage device 6 may conform to one or more standard form factors. Some example standard form factors include, but are not limited to, 3.5" hard disk drive (HDD) or SSD, 2.5" HDD or SSD, 1.8" HDD or SSD; peripheral component interconnect (PCI), PCI-extended (PCI-X), PCI Express (PCIe) (e.g., PCIe ×1, ×4, ×8, ×16, PCIe Mini Card, MiniPCI, etc.), non-volatile memory express (NVMe), or the like. In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, and NVMe. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 includes controller 8, which may manage one or more operations of storage device 6. For instance, controller 8 may manage the reading of data from and/or the writing of data to memory devices 16.

Storage device 6 may includes NVMA 10, which may include a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks, each of which may be divided into a plurality of pages.

Figure 2:
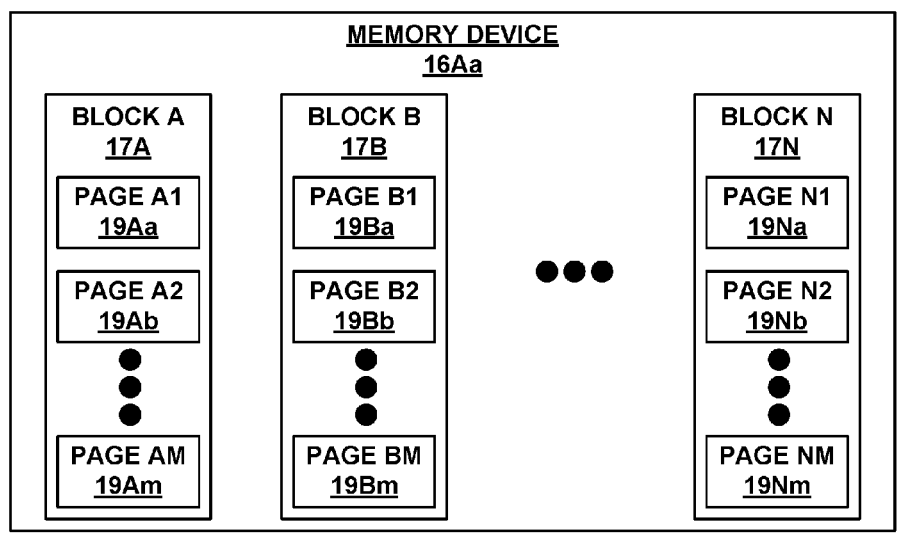
FIG. 2 is a conceptual diagram illustrating an example memory device, in accordance with one or more aspects of this disclosure.

FIG. 2. is a conceptual block diagram illustrating an example memory device 16Aa, which includes a plurality of blocks 17A-17N (collectively, "blocks 17"), each of which is divided into a plurality of pages 19Aa-19Nm (collectively, "pages 19"). Each page of the pages 19 within a particular memory device (e.g., memory device 16Aa may include a plurality of flash memory cells. In NAND flash memory devices, rows of flash memory cells may be electrically connected using a word line to define a page of the plurality of pages 19. Respective cells in each of the pages 19 may be electrically connected to respective bit lines. Controller 8 may write data to and read data from NAND flash memory devices at the page level and erase data from NAND flash memory devices at the block level.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16An may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 16. In this way, the number of separate connections between controller 8 and memory devices 16 may be reduced. Additionally, as each channel has an independent set of connections to controller 8, the reduction in connections may not significantly affect the data throughput rate as controller 8 may simultaneously issue different commands to each channel.

In some examples, storage device 6 may include a number of memory devices 16 selected to provide a total capacity that is greater than the capacity accessible to host device 4. This is referred to as over-provisioning. For example, if storage device 6 is advertised to include 240 GB of user-accessible storage capacity, storage device 6 may include sufficient memory devices 16 to give a total storage capacity of 256 GB. The 16 GB of memory devices 16 may not be accessible to host device 4 or a user of host device 4. Instead, the over-provisioned portion of storage devices 16 may provide additional blocks to facilitate writes, garbage collection, wear leveling, and the like. Further, the over-provisioned storage devices 16 may provide additional blocks that may be used if some blocks wear to become unusable and are retired from use. The presence of the additional blocks may allow retiring of the worn blocks without causing a change in the storage capacity available to host device 4. In some examples, the amount of over-provisioning may be defined as $p=(T-D)/D$, wherein p is the over-provisioning ratio, T is the total storage capacity of storage device 2, and D is the storage capacity of storage device 2 that is accessible to host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area and/or volume) of the one or more power storage components. in other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information 13 in volatile memory 12. until cached information 13 is written to memory devices 16. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

Although described herein primarily in terms of an SSD, in other examples, storage device 6 may include a hard disk drive (HDD), such as a shingled magnetic recording (SMR) HDD. In some examples, HDDs utilize L2P or indirection tables similar to those described herein, and may benefit from the logical zoning techniques described in this disclosure.

In some examples, controller 8 may use volatile memory 12 to store a logical to physical (or virtual to physical) data address translation table, referred to herein as an L2P table. The L2P table may include entries that map a logical data address to a corresponding physical data address. For instance, the L2P table may map a Logical Block Number (LBN) to a NAND Physical Addressing Unit or Physical Block Number (PBN). In some examples, rather than include an LBN for each entry, the L2P table may include an index that encodes the respective LBN. In some examples, the L2P table may not store the index value (or the LBN, for that matter) within the respective entry. Instead, in such cases, host device 4 may refer to a unit of data using the LBN, and controller 8 may utilize PBNs to directly write data to or read data from memory devices 16.

Controller 8 may maintain the L2P table in volatile memory 12 for a variety of reasons. One reason for maintaining the L2P table largely is because controller 8 may erase NAND blocks of memory devices 16 before being once again programming the erased NAND blocks. For performance reasons, controller 8 may not erase a currently-mapped NAND block associated with a particular LBN and then program the newly-erased NAND each time data needs to be stored or programmed. Instead, to store the data for the LBN, controller 8 may write the data to a pre-erased (or free) NAND block of memory devices 16. As a result of these dynamic rewrites to pre-erased PBNs, the content of the L2P table may change as host 4 sends write commands.

Internally within storage device 6, controller 8 performs garbage collection by moving valid user data for a particular LBN from one PBN to another PBN within memory devices 16. As such, the garbage collection may be referred to as a "background" process with respect to the operation of storage device 6. The garbage collection performed by controller 8 may cause the content of the L2P to change, as well. More specifically, even though controller 8 transfers data from one PBN to another PBN, host 4 may still associate the transferred data with the same LBN. Thus, each garbage collection operation performed by controller 8 may potentially trigger a need to update to the L2P table. By maintaining the L2P table in volatile memory 12, controller 8 may reduce a write overhead of updating the L2P table, simplify wear leveling by reducing a need to include data from the L2P table in the wear leveling, increase a speed of writing updates to the L2P table, or the like. In some examples, controller 8 may periodically write a current copy of the L2P table to NVMA 10.

Storage device 6 may encounter a power loss under a variety of circumstances. One example is an intentional power-down, such as may occur when a user shuts down a computing device that accesses storage device 6. Another example is an unintended power loss, such as during a power outage, loose connection, or other malfunction. Whether a power loss is intentional or unintended, upon the subsequent power up, controller 8 may need to re-establish the L2P table content to reflect the actual LBN-to-PBN mappings that were last valid before the power loss. Upon re-establishing the L2P table after a full power cycle (power-down or power-loss followed by power-up), controller 8 can once again service write or read commands sent by host 4.

To restore the content of L2P table to reflect currently-valid LBN-to-PBN mappings, controller 8 may track a log list at runtime. The log list chronicles the change history of LBN-to-PBN mappings in chronological order. The length of the log list may be sufficiently long to capture all LBN-to-PBN mapping updates since the last time the L2P table was committed to NVMA 10.

Controller 8 may constrain the length of the log list to remain at within a maximum or threshold length. The maximum length may reflect a length that controller 8 can replay or "journal" within the backup time (or "power cap") provided by power supply 11 at power loss. For instance, controller 8 may limit the maximum log list length such that the power cap provided by power supply 11 is sufficiently long (in units of time) for controller 8 to write the log list into non-volatile memory array 10. Upon a subsequent power-up, controller 8 may update the last L2P table committed to NVMA 10 using the log list. The process of iterating through the log list to update the L2P table may be referred to as "replaying," "walking through," "stepping through," or "journaling" the log list. Controller 8 replays the log list in the same order in which the log list was recorded, in serial fashion.

As the user-accessible capacity of non-volatile memory 10 increases, so does the size of the L2P table maintained by controller 8. In turn, the length of the log list maintained by controller 8 may potentially increase, as well. Any increase in log list length affects the time taken by controller 8 to replay the log list at power up. Thus, increasing storage capacity provided by non-volatile memory array 10 may negatively impact increase) the power-up ready time of storage device 6.

To reduce power-up delays caused by log list replaying, controller 8 may be configured to operate according to various aspects of this disclosure. For instance, controller 8 may apply a logical zoning scheme to identify different logical zones within the L2P table. Controller 8 may maintain or journal a respective log list for each logical zone individually, and in turn, replay multiple individual log lists in parallel upon power-up. As each log list corresponds to a single logical zone of the L2P table, controller 8 may implement the techniques of this disclosure to replay multiple LBN-to-PBN changes in parallel. By parallelizing the log list replay process, controller 8 may reduce the replaying time during a power-up that follows an intended or unintended power loss.

According to various aspects of this disclosure, controller 8 may identify multiple zones within an L2P table without partitioning the L2P table into separate, standalone sub-tables. Thus, the L2P table zoning techniques of this disclosure enable controller 8 to zone an L2P table while maintaining the single-table identity of the L2P table. Additionally, controller 8 may associate each zone of the L2P table with its own separate log list. Controller 8 may group entries into a single zone based on the LBN components of the entries. Said another way, controller 8 may form the zones of the L2P table using the logical addresses of the various individual table entries. As such, the zones identified by controller 8 within an L2P table are also referred to herein as "logical zones" and the various zone-identification techniques are referred to herein as "logical zoning."

Because each identified logical zone is associated with its own individual log list, controller 8 may have multiple, smaller log lists available for L2P table updating at power-up of storage device 6. Therefore, at a time of log list replay replaying, controller 8 can avail of parallel-processing capabilities to concurrently replay multiple log lists for the same L2P table. With the increasing prevalence of multi-core processors, controller 8 may leverage the logical zoning and multiple log list formation of this disclosure to increase the number of log lists processed concurrently for a single L2P table. As examples, controller 8 may utilize 8-core CPUs or 16-core CPUs to replay several log lists concurrently, with the common end goal of reconstructing a single L2P table. The concurrency and parallelization of the log list replaying process for a single L2P table may speed up the power-up ready time for storage device 6 following a power loss of any kind. Thus, controller 8 may implement the techniques of this disclosure to leverage the increasingly-powerful computer architecture that is commercially available in order to improve the power-up readiness of storage device 6.

Figure 3:
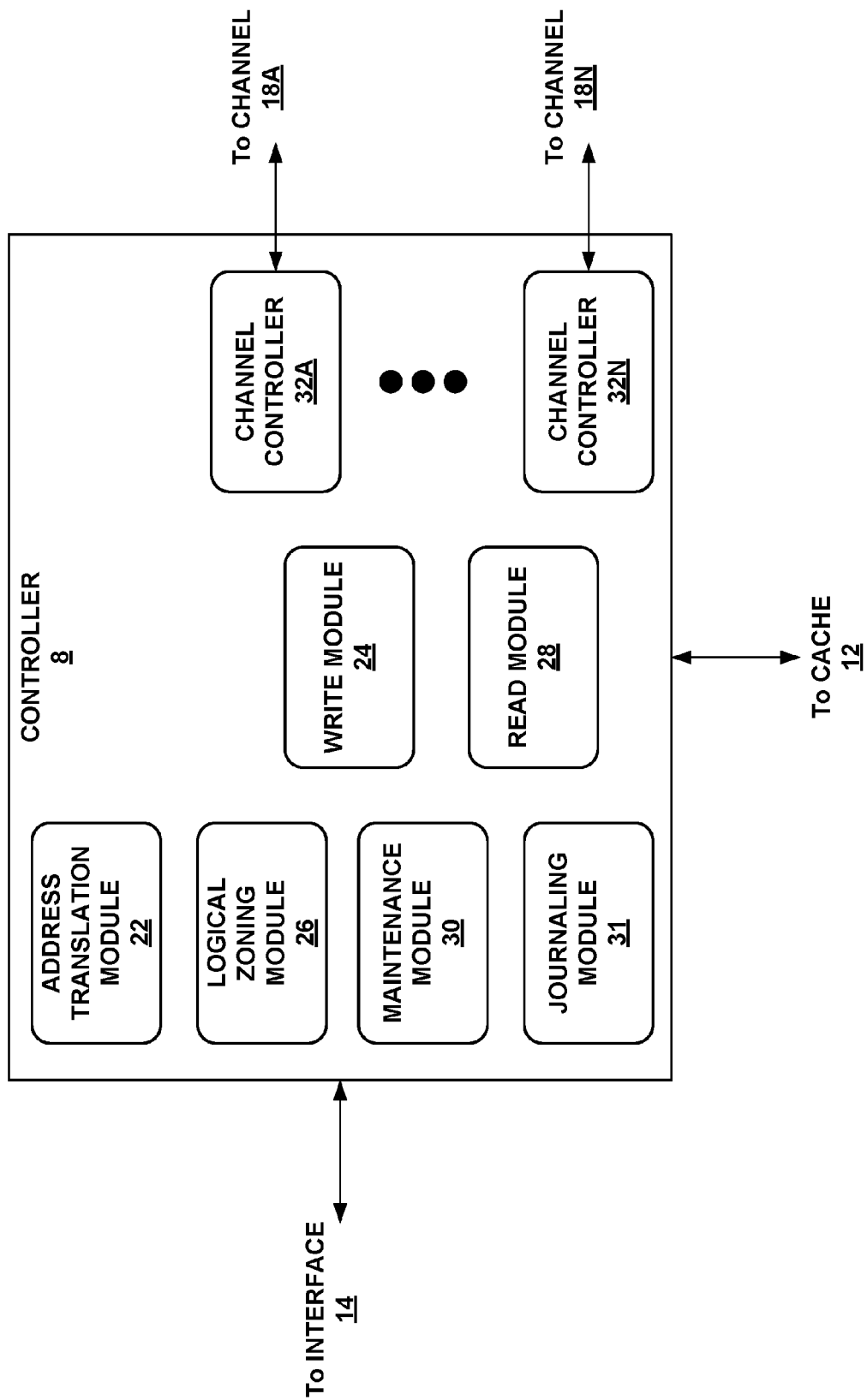
FIG. 3 is a conceptual and schematic block diagram illustrating an example controller, in accordance with one or more aspects of this disclosure.

FIG. 3 is a conceptual and schematic block diagram illustrating example details of controller 8. In some examples, controller 8 may include an address translation module 22, a write module 24, a logical zoning module 26, a read module 28, a maintenance module 30, a journaling module 31, and a plurality of channel controllers 32A-32N (collectively, "channel controllers 32"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with the host device 4 via interface 14 and manage the storage of data to and the retrieval of data from memory devices 16. For example, write module 24 of controller 8 may manage writes to memory devices 16. For example, write module 24 may receive a message from host device 4 via interface 14 instructing storage device 6 to store data associated with a logical data address and the data. Write module 24 may manage writing of the data to memory devices 16.

For example, write module 24 may communicate with address translation module 22, which manages translation between logical data addresses used by host device 4 to manage storage locations of data and physical data addresses used by write module 24 to direct writing of data to memory devices 16. Address translation module 22 of controller 8 may utilize an L2P table and one or more log lists that associates logical data addresses (or logical block addresses) of data stored by memory devices 16 to physical data addresses (or physical block addresses) of data stored by memory devices 16. For example, host device 4 may utilize the logical data addresses of the data stored by memory devices 16 in instructions or messages to storage device 6, while write module 24 utilizes physical data addresses of the data to control writing of data to memory devices 16. (Similarly, read module 28 may utilize physical data addresses to control reading of data from memory devices 16.) The physical data addresses correspond to actual, physical locations of memory devices 16. In some examples, address translation module 22 may store the L2P table and one or more log lists in volatile memory 12. In some examples, address translation module 22 may periodically store or commit a current copy of the L2P table to NVMA 10 (FIG. 1).

In this way, host device 4 may be allowed to use a static logical data address for a certain set of data, while the physical data address at which the data is actually stored may change. Address translation module 22 may maintain the L2P table and one or more log lists to map the logical data addresses to physical data addresses to allow use of the static logical data address by the host device 4 while the physical data address of the data may change, e.g., due to wear leveling, garbage collection, or the like. In some examples, the L2P translation table may be a single layer table, such that by applying a hash to a logical data address received from host device 4, address translation module 22 may directly retrieve a corresponding physical data address.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update the L2P table or a log list that includes the logical block address based on the selected blocks. For instance, write module 24 may receive a message from host device 4 that includes a unit of data and a logical data address, select a block and page within a particular memory device of memory devices 16 to store the data, cause the particular memory device of memory devices 16 to actually store the data (e.g., via a channel controller of channel controllers 32 that corresponds to the particular memory device), and cause address translation module 22 to update the L2P table or log list that includes the logical block address to indicate that the logical data address corresponds to the selected physical data address within the particular memory device of memory devices 16.

In some examples, in addition to causing the data to be stored by memory devices 16, write module 24 may cause memory devices 16 to store information which may be used to recover the unit of data should one or more of the blocks fail or become corrupted. The parity information may be used to recover the data stored by other blocks. In some examples, the parity information may be an XOR of the data stored by the other blocks.

In order to write a bit with a logical value of 0 (charged) to a bit with a previous logical value of 1 (uncharged), a large current is used. This current may be sufficiently large that it may cause inadvertent changes to the charge of adjacent flash memory cells. To protect against inadvertent changes, an entire block of flash memory cells may be erased to a logical value of 1 (uncharged) prior to writing any data to cells within the block. Because of this, flash memory cells may be erased at the block level and written at the page level.

Thus, to write even an amount of data that would consume less than one page, controller 8 may cause an entire block to be erased. This may lead to write amplification, which refers to the ratio between the amount of data received from host device 4 to be written to memory devices 16 and the amount of data actually written to memory devices 16. Write amplification contributes to faster wearing of the flash memory cells than would occur with no write amplification. Wear to flash memory cells may occur when flash memory cells are erased due to the relatively high voltages used to erase the flash memory cells. Over a plurality of erase cycles, the relatively high voltages may result in changes to the flash memory cells. Eventually, the flash memory cells may wear out, such that data may no longer be written to the cells. Write amplification may be exacerbated by using larger blocks and/or pages.

One technique that controller 8 may implement to reduce write amplification and wear of flash memory cells includes writing data received from host device 4 to unused blocks or partially used blocks. For example, if host device 4 sends data to storage device 6 that includes only a small change from data already stored by storage device 6. The controller then may mark the old data as stale or no longer valid. Over time, this may reduce a number of erase operations blocks are exposed to, compared to erasing the block that holds the old data and writing the updated data to the same block.

Responsive to receiving a write command from host device 4, write module 24 may determine at which physical locations (e.g., blocks) of memory devices 16 to write the data. For example, write module 24 may request from address translation module 22 one or more physical block addresses that are empty (e.g., store no data), partially empty (e.g., only some pages of the block store data), or store at least some invalid (or stale) data. Upon receiving the one or more physical block addresses, write module 24 may select one or more block as discussed above, and communicate a message that causes channel controllers 32A-32N (collectively, "channel controllers 32") to write the data to the selected blocks.

Read module 28 similarly may control reading of data from memory devices 16. For example, read module 28 may receive a message from host device 4 requesting data with an associated logical data address. Address translation module 22 may convert the logical data address to a physical data address using the L2P table or the log list that includes the logical data address. Read module 28 then may control one or more of channel controllers 32 to retrieve the data from the physical data addresses. Similar to write module 24, read module 28 may select one or more blocks and communicate a message to that causes channel controllers 32 to read the data from the selected blocks.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of one or more of write module 24, read module 28, maintenance module 30, or journaling module 31.

Maintenance module 30 may be configured to perform operations related to maintaining performance and extending the useful life of storage device 6 (e.g., memory devices 16). For example, maintenance module 30 may implement at least one of wear leveling or garbage collection.

As described above, erasing flash memory cells may use relatively high voltages, which, over a plurality of erase operations, may cause changes to the flash memory cells. After a certain number of erase operations, flash memory cells may degrade to the extent that data no longer may be written to the flash memory cells, and a block including those cells may be retired (no longer used by controller 8 to store data). To increase the amount of data that may be written to memory devices 16 before blocks are worn and retired, maintenance module 30 may implement wear leveling.

In wear leveling, maintenance module 30 may track a number of erases of or writes to a block or a group of blocks, for each block or group of blocks. Maintenance module 30 may cause incoming data from host device 4 to be written to a block or group of blocks that has undergone relatively fewer writes or erases, to attempt to maintain the number of writes or erases for each block or group of blocks approximately equal. This may cause each block of memory devices 16 to wear out at approximately the same rate, and may increase the useful lifetime of storage device 6.

Although this may reduce write amplification and wear of flash memory cells by reducing a number of erases and writing data to different blocks, this also may lead to blocks including some valid (fresh) data and some invalid (stale) data. To combat this, maintenance module 30 may implement garbage collection. In a garbage collection operation, maintenance module 30 may analyze the contents of the blocks of memory devices 16 to determine a block that contain a high percentage of invalid (stale) data. Maintenance module 30 then may rewrite the valid data from the block to a different block, and then erase the block. This may reduce an amount of invalid (stale) data stored by memory devices 16 and increase a number of free blocks, but also may increase write amplification and wear of memory devices 16.

To maintain accurate information, journaling module 31 may be invoked to replay the log list for the L2P table. More specifically, log list replay is needed in order to construct a current version of the L2P table. Journaling module 31 may replay the log list to construct the current version of the L2P table based on the last committed version of the L2P table and the up-to-date version of the corresponding log list.

In accordance with one or more techniques of this disclosure, logical zoning module 26 of controller 8 may identify multiple logical zones in an L2P table. Journaling module 31 of controller 8 may journal each logical zone using a separate log list. In turn, controller 8 (and/or various components thereof) may replay two or more of the log lists in parallel at power-up, thereby utilizing parallel processing technology to improve L2P table reconstruction time. In this way, logical zoning module 26 and Journaling module 31 of controller 8 may implement aspects of this disclosure to process potentially long L2P tables in more manageable portions, and thereby parallelize the log list replay operations at power-up of storage device 6.

While journaling module 31 may leverage multi-core processing or other parallel processing capabilities for log list replay in accordance with this disclosure, journaling module 31 may use any available processing resources for forming the log list. For instance, journaling module 31 can still use single-core processing for log list formation, while drawing upon multi-core processing for log list replay, to provide one or more advantages of the techniques described herein. Although described herein with respect to processors for ease of discussion, it will be appreciated that journaling module 31 may also draw upon processing (e.g., parallel processing) capabilities of other devices and components, such as the functionalities provided by a hardware assist engine, to perform the parallelized log list replay techniques of this disclosure.

Figure 4:
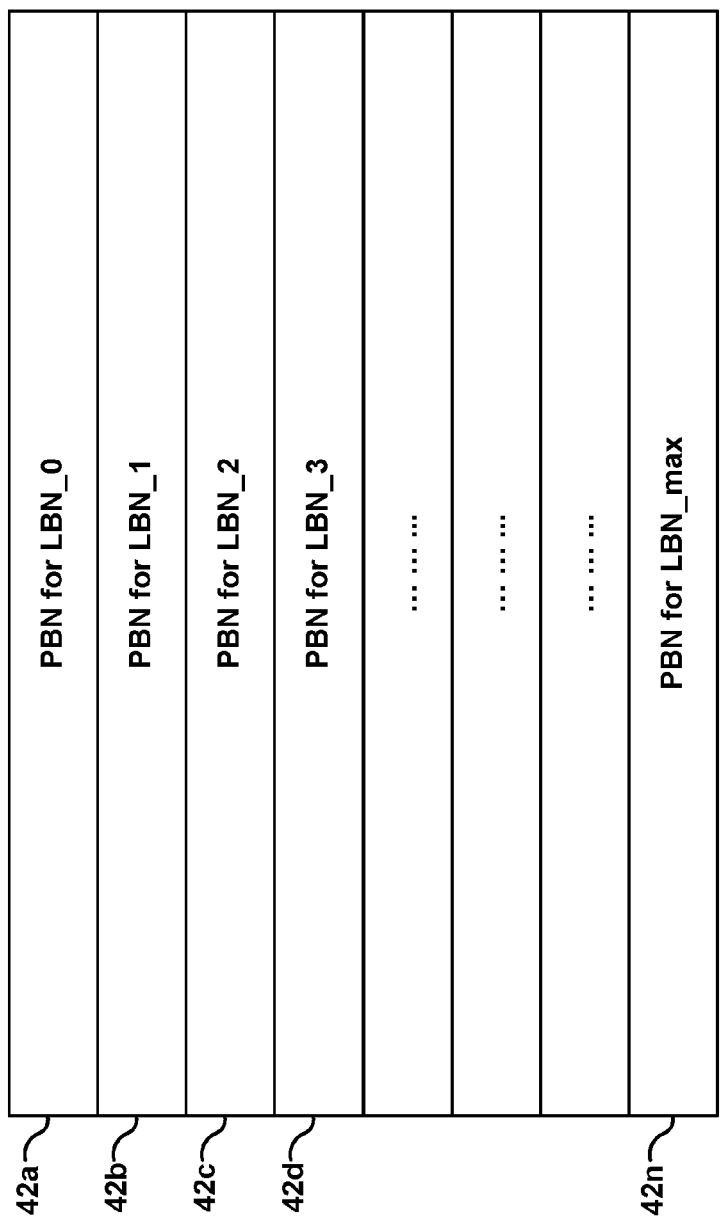
FIG. 4 is a conceptual diagram illustrating an example logical-to-physical (L2P) table.

Typically an L2P table (which is not zoned according to the techniques of this disclosure) is expressed as a linear array of entries. The entries of such an L2P are ordered based on an ascending order of the LBN component of the entries. As discussed above, each entry of the L2P table also includes a PBN that is mapped to the LBN of the same entry. FIG. 4 is a conceptual diagram illustrating an example L2P table 40. As illustrated in FIG. 4, L2P table 40 is a linear array of entries 42a-42n (collectively, "entries 42"). The first entry of L2P table 40 is entry 42a, represented by the topmost position of L2P table 40. Entry 42a indicates the PBN mapping for the first LBN, namely, the LBN indexed as "LBN_0." The second entry of L2P table 40 is entry 42b, represented by the second-from-top position of L2P table 40, and indicates the PBN mapping for the second LBN, namely, the LBN indexed as "LBN_1." In this way, L2P table 40 includes a single entry for a PBN-to-LBN mapping, arranged sequentially from the first LBN (LBN_0) to a maximum LBN ("LBN_max") at entry 42n.

Figure 5:
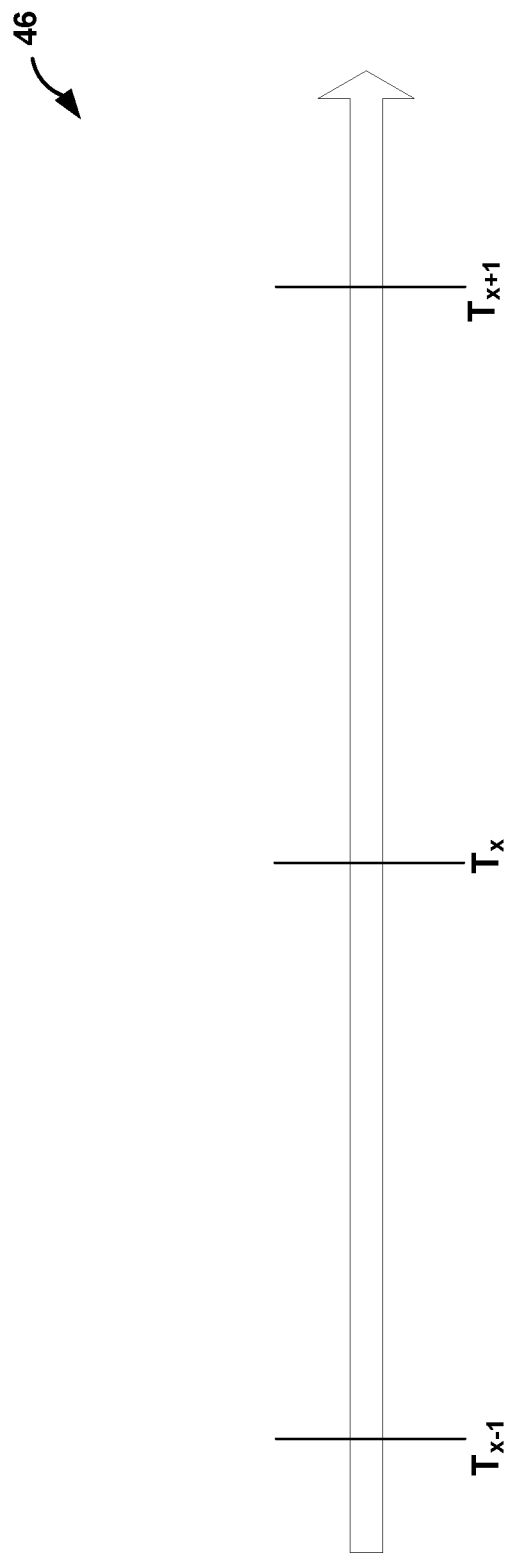
FIG. 5 is a conceptual diagram illustrating a timeline with respect to which various aspects of this disclosure are described.

Because of the nature of writing data in an SSD, routine maintenance operations such as garbage collection, and for other reasons, the PBN corresponding to a particular LBN can change during runtime. FIG. 5 is a conceptual diagram illustrating a timeline 46 with respect to which various aspects of this disclosure are described. The dynamic nature of LBN-to-PBN mapping is discussed herein with respect to timeline 46. It will be appreciated that FIG. 5, while not necessarily drawn to scale, represents the passage of time in fixed increments, such as milliseconds (ms), microseconds (μs), nanoseconds (ns), or any other unit of time. The time between $T_{x-1}$ and $T_x$ may or may not be the same as the time between $T_x$ and $T_{x+1}$.

At an instance of time represented on timeline 46 with the timestamp "$T_{x-1}$," LBN_0 may be associated with, as a non-limiting example, PBN_0. The 3-tuple representing a static LBN_0, its corresponding PBN_0, and the timestamp ($T_{x-1}$) of the time of correspondence is expressed herein as "Pbn_ForLbn0_AtT$_{x-1}$." However, as illustrated in FIG. 4, each of entries 42 in L2P table 40 includes only a 2-tuple that maps a current PBN to the static LBN. As such, L2P table 40 may potentially include valid entries only for a single timestamp (e.g., $T_{x-1}$) on timeline 46, depending on whether or not any of entries 42 requires updating in response to garbage collection or other operations that could change an LBN-to-PBN mapping.

Between time $T_{x-1}$ and a subsequent instant of time (represented by timestamp "$T_x$" on timeline 46), host 4 may send a write command associated with LBN_0, or (internally within storage device 6) maintenance module 30 may perform garbage collection by moving data associated with LBN_0. As a result, LBN_0 may map to different PBN values at times $T_{x-1}$ and $T_x$. Expressed using the 3-tuple notation introduced above, the PBN values for Pbn_ForLbn0_AtTx−1 and Pbn_ForLbn0_AtTx are different. Thus, journaling module 31 may update L2P table 40 by changing the PBN value for LBN_0 to a new value. While the update may not necessarily be effected at time $T_x$, journaling module 31 may log the change in a log list, and effect the change at the time of log list replay (e.g., upon power-up of storage device 6).

Figure 6:
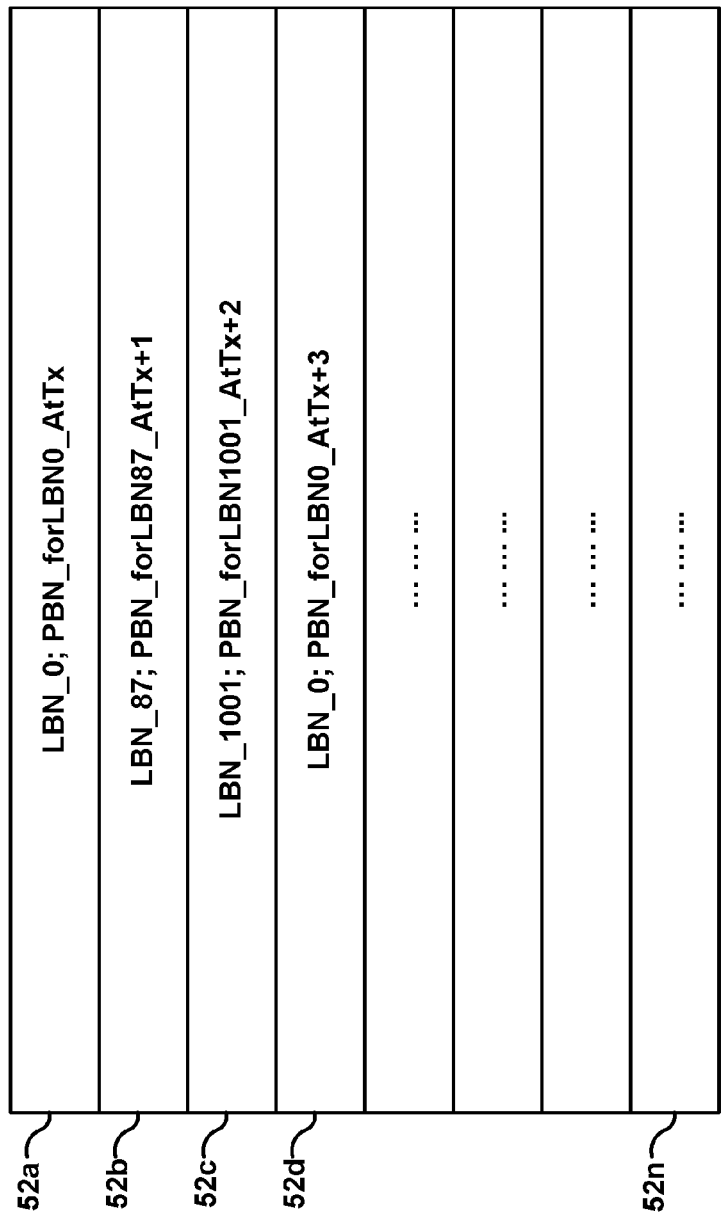
FIG. 6 illustrates an example log list that a device may maintain to chronicle changes to be implemented with respect to an L2P table.

As described above, journaling module 31 maintains a log list at (or throughout) runtime. The log list reflects LBN-to-PBN mapping changes in chronological order. Each entry of the log list may follow the 2-tuple notation discussed above, thereby mapping a static LBN to a dynamic PBN, and indicating the recency of each update, based on each entry's position in a top-to-bottom sequential order. FIG. 6 illustrates an example log list 50 that journaling module 31 may maintain, to chronicle changes to be implemented with respect to L2P table 40. At a first entry 52a of log list 50, journaling module 31 has appended the tuple of LBN_0, Pbn_ForLbn0_AtTx. At a second entry 52b of log list 50, journaling module 31 has appended the tuple of LBN_87, Pbn_ForLbn87_AtTx+1. At a third entry 52c of log list 50, journaling module 31 has appended the tuple of LBN_1001, Pbn_ForLbn1001_AtTx+2. At a fourth entry 52d of log list 50, journaling module 31 has appended the tuple of LBN_0, Pbn_ForLbn0_AtTx+3. Journaling module 31 may append entries 52 in a manner that enables journaling module 31 to later replay entries 52 in a queue fashion, a stack fashion, or ad hoc fashion, at replay. In a queue scenario, journaling module 31 may replay entries 52 in a first-in-first-out (FIFO) order, such as by starting at entry 52a and working its way down log list 50 sequentially. In a stack scenario, journaling module 31 may replay entries 52 in a last-in-first-out (LIFO) order, such as by starting at entry 52n and working its way up log list 50 sequentially. In an ad hoc scenario, journaling module 31 may replay entries 52 in a random order to update L2P table 40.

As shown, entries 52 of log list 50 are appended in chronological order. It will be appreciated that consecutive timestamps $T_x$, $T_{x+1}$, $T_{x+2}$, and $T_{x+3}$ are not necessarily separated from their neighbors by fixed increments of time. Instead, the series of timestamps reflected in log list 50 are chronologically-advancing instances at which journaling module 31 identifies a change to be implemented with respect to L2P table 40. As an example, $T_{x+1}$ may follow $T_x$ by 2 nanoseconds, while $T_{x+2}$ may follow $T_{x+1}$ by 5 nanoseconds. Thus, the order of log list 50 is chronological, in that journaling module 31 appends a new entry based on the time at which journaling module 31 detects a change to an existing LBN-to-PBN mapping. Each of timestamps $T_x$ through $T_{x+3}$ may represent an instance of a LBN-PBN mapping change caused by due to new host write or due to internal garbage collection data movement. It will be appreciated that the time interval between the timestamps of any two adjacent entries 52 is not necessarily fixed.

FIG. 6 illustrates a scenario in which log list 50 includes multiple entries with respect to a single LBN. More specifically, log list 50 includes two instances of LBN-PBN mapping changes for LBN_0. In the context of log list formation, the occurrence of multiple entries for a single LBN is possible. In the specific example of log list 50, entries 52*a* and 52*d* both represent LBN-to-PBN mapping changes for LBN_0. Entry 52*a* represents a PBN mapping change that was detected and/or logged at timestamp $T_x$ for LBN_0. Entry 52*d* represents a PBN mapping change that was detected and/or logged at timestamp $T_{x+3}$. The difference in logging time is illustrated by the position of each of entries 52 in top-to-bottom order, as shown in FIG. 6. The timestamps illustrated in FIG. 6 may not necessarily be stored in entries 52, but instead, are included in FIG. 6 for purposes of illustration only. Thus, the PBN that is mapped to LBN_0 in entry 52*d* represents an update to the mapping change in entry 52*a*. As such, entry 52*d* renders entry 52*a* obsolete or moot. If none of the entries subsequent to entry 52*d* in table 50 (i.e., from the entry immediately subsequent to entry 52*d* all the way through entry 52*n*) is related LBN_0, then entry 52*d* represents the current PBN mapping for LBN_0. In this case, upon power-up of storage device 6, controller 8 (or components thereof, such as address translation module 22) may update L2P table 40 to reflect the LBN-to-PBN mapping represented by entry 52*d* of log list 50.

An example use case scenario with respect to log list 50 is described below. Upon fabrication and factory production of storage device 6, controller 8 may receive new write commands from host 4. As illustrated by in log list 50, host 4 may send write commands corresponding to various logical addresses that include LBN_0, LBN_87, and LBN_1001. In the example of log list 50, host 4 sends multiple write commands corresponding to LBN_0. After journaling module appends entry 52*d* to log list 50, storage device 6 may lose power, either by way of an intended power down or through an unexpected power loss. The power cap (expressed in units of time) provided by power supply 11 provides a relatively short-duration power burst. The duration of the power cap afforded by power supply 11 is sufficiently long for journaling module 31 to save log list 50 to non-volatile memory array 10 (e.g., either in NAND or EEPROM). Upon a subsequent restoration of power to (e.g., "power-on" or "power-up") of storage device 6, address translation module 22 iterates (or "walks" or "steps") through log list 50 to update L2P table 40.

The above-described process of iterating through log list 50 to update L2P table 40 is referred to herein as a "log list replaying" process. It will be appreciated that the use case scenario described above represents a relatively simple example, for ease of illustration. In practice, log lists can be relatively lengthy. In cases of relatively long log lists, at power on, log list replaying can become significantly time consuming. More specifically, a chronological, thorough, entry-by-entry replay of the entire log list can hinder the power-up time in the order of hundreds of seconds, and may also bottleneck the distribution of clock cycles and processing resources at power-up.

One possible approach to mitigating these issues arising from log list replaying is to divide (or "partition") the entire SSD into sub-SSDs. For example, partitioning a 4 TB SSD could yield four virtual 1 TB SSDs. Each sub-SSD services one-quarter of the LBN range that the SSD can service. For instance, if the SSD's total user capacity is represented by the upper-limit LBN index 'U,' then the first sub-SSD may service LBNs ranging from index values of 0 through ((U−1)/4), the second sub-SSD may service LBNs ranging from (U/4) through ((U−1)/2), the third sub-SSD may service LBNs ranging from (U/2) through (3*(U−1)/4), and the fourth sub-SSD may service LBNs ranging from (3*U/4) through (U−1). According to such SSD partitioning techniques, the NAND blocks in the SSD are divided into four sub-SSDs as well. Thus, if the write commands sent by the host are biased or skewed towards a particular LBN sub-range, the partitioning techniques may be subject to various skew-based shortcomings or pitfalls. As examples of potential disadvantages, the SSD cannot perform garbage collection or wear levelling on a global basis across the entire SSD. More specifically, each post-partition sub-SSD is recognized as a discrete entity, and the SSD would need to perform garbage collection and wear leveling on a per-entity basis within the close universe of each sub-SSD. As such, the garbage collection and wear leveling may be constrained, in that fresh resources from another sub-SSD are unavailable for resiliency within a current sub-SSD, in any SSD partitioning-based solution.

To mitigate delays caused by log list replay, while maintaining the advantages associated with SSD-wide global garbage collection and wear leveling, controller 8 and various components thereof may implement one or more techniques of this disclosure. For instance, logical zoning module 26 may identify multiple (e.g., two or more) logical zones within L2P table 40. More specifically, logical zoning module 26 may maintain the single-table status of L2P table 40 even after identifying the zones.

Figure 7:
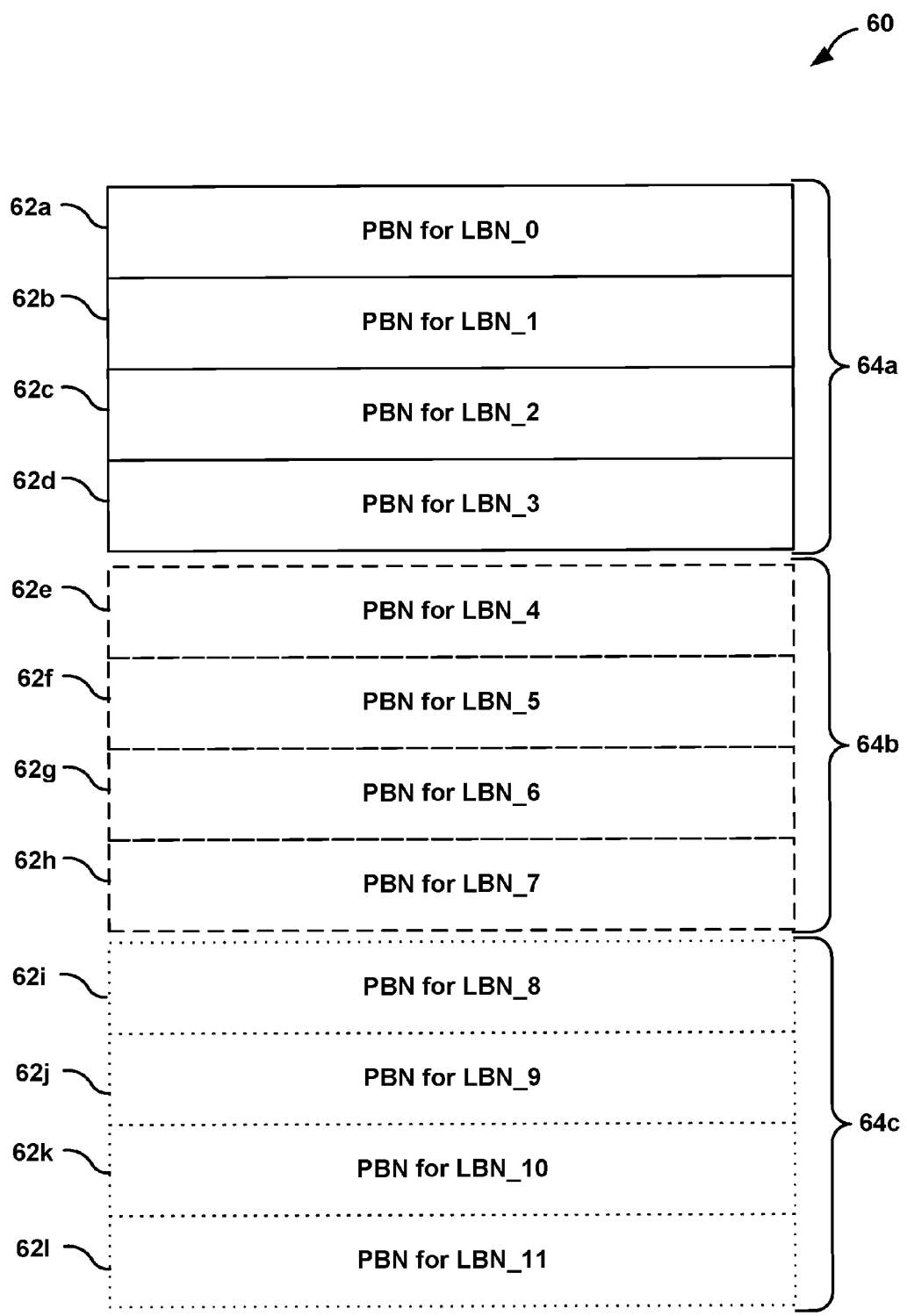
FIG. 7 illustrates a zoned L2P table, in accordance with one or more aspects of this disclosure.

FIG. 7 illustrates a logically zoned L2P table 60. It will be appreciated that logically zoned L2P table 60 may represent just a portion of an L2P table. For instance, logical zoning module 26 may identify multiple logical zones in an L2P (e.g., L2P table 40 of FIG. 4), to form logically zoned L2P table 60. Logically zoned L2P table 60 includes twelve entries, labeled entries 62*a*-62*l*. In this particular example, logical zoning module 26 may identify multiple logical zones, each logical zone containing four entries. As shown, logically zoned L2P table 60 includes three logical zones, labeled as logical zones 64*a*-64*c*. Entries 62*a*-64*d* belong to logical zone 64*a*, and are distinguished visually using solid-line borders. Entries 62*e*-62*h* belong to logical zone 64*b*, and are distinguished visually using dashed-line borders. Entries 62*i*-62*l* belong to logical zone 64l, and are distinguished visually using dotted-line borders. FIG. 7 also includes a space between every two consecutive logical zones 64, to illustrate the logical demarcation identified by logical zoning module 26. It will be appreciated that, even though FIG. 7 uses spaces to illustrate logical boundaries between logical zones 64, logically zoned. L2P table 60 still represents a contiguous, monolithic table, in accordance with the techniques of this disclosure.

Logically zoned L2P table 60 represents an implementation in which logical zoning module 26 identifies zones in a "serial" manner. More specifically, logical zoning module 26 may identify a single zone in logically zoned L2P table 60 by selecting contiguous blocks or series of entries 62. In accordance with the serial implementation of the logical zoning techniques of this disclosure, each series of entries 62 may correspond to a contiguous series of LBNs. For instance, the first zone, namely logical zone 64a, represents a contiguous block or series of entries 62a-62d. According to a serial implementation of L2P table zoning, logical zoning module 26 may divide the total number of entries in an L2P table by a desired number of zones, to obtain a number of entries per zone. In the example of logically zoned L2P table 60, logical zoning module 26 has arrived at a determination of four entries-per-zone.

In a simplified example where an entire logically zoned L2P table 60 includes a total of twelve entries, logical zoning module 26 may determine that logically zoned L2P table 60 is to be divided into a total of three zones. Dividing the total number of entries (twelve) by the desired number of zones (three), logical zoning module 26 may determine that each identified zone will include four entries. Based on the logical zoning scheme for the logically L2P table 60 being the serial zoning scheme, logical zoning module 26 may identify each of logical zones 64 by starting at the first entry (62a), and identifying contiguous blocks of four entries. In this way logical zoning module 26 may identify each of logical zones 64 in logically zoned L2P table 60. Additionally, journaling module 31 may implement the techniques of this disclosure to form and maintain a separate log list for each of logical zones 64 identified by logical zoning module 26. In turn, controller 8 to draw upon parallel processing capabilities to replay two or more of the log lists in parallel. In this way, logical zoning module 26 and journaling module 31 may enable controller 8 to replay log lists for different parts of logically zoned L2P 60 simultaneously, thereby improving power-up time of storage device 6 and spreading processing tasks more efficiently across multiple cores.

By using the serial zoning scheme of this disclosure to identify logical zones 64 in zoned L2P table 60, logical zoning module 26 may provide one or more potential advantages. For instance, logical zoning module 26 may reduce the complexity of parallel log list formation. In cases where the system operates better with localized access for log lists, the serial implementation causes journaling module 31 to access one log list (e.g., a. sub-list for a single zone) more often. Thus, the serial implementation of logical zoning may yield a favorable result in scenarios where the system is better-suited for localized access. Moreover, if host 4 performs write operations in a localized fashion, then a particular zone of non-volatile memory array 10 may be updated more often than other zones. In this scenario, the serial implementation is a relatively efficient solution, because of reduced write amplification, thereby potentially mitigating hardware endurance issues. For instance, non-volatile memory array 10 may last longer under sustained use according to the serial zoning scheme.

Figure 8:
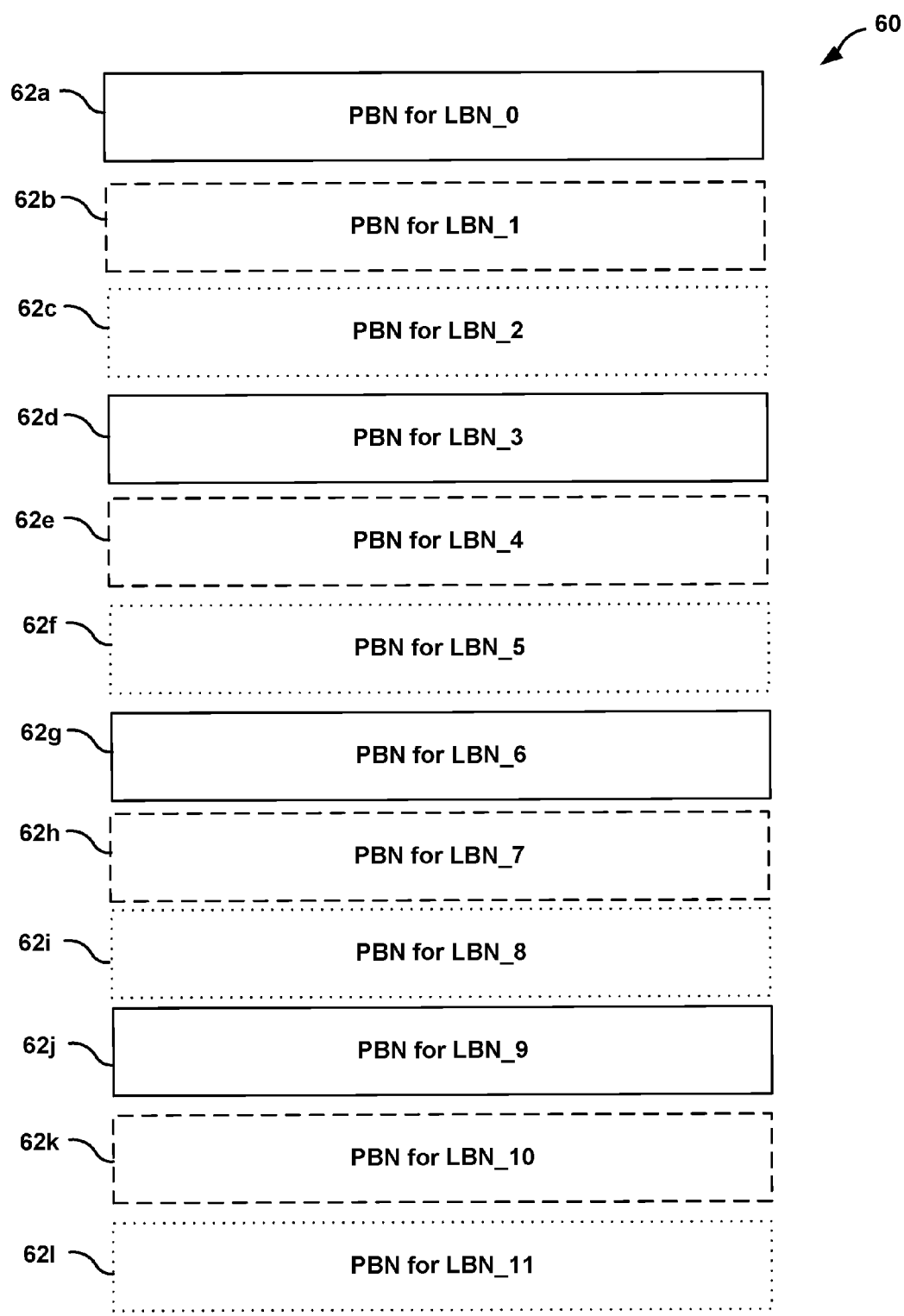
FIG. 8 illustrates another example of a zoned L2P table, in accordance with one or more aspects of this disclosure.

FIG. 8 illustrates another example of zoned L2P table 60. In the example of FIG. 8, logical zoning module 26 may identify zones 64 according to an interleaved zoning scheme. In contrast to the serial zoning scheme illustrated with respect to FIG. 7, logical zoning module 26 may implement the interleaved zoning scheme to spread the identified zones evenly across the originating L2P table. Similar to FIG. 7, FIG. 8 includes spaces between different zones only for ease of illustration purposes, and it will be appreciated that zoned L2P table 60 of FIG. 8 also represents a single, contiguous, monolithic table.

Logical zones 64 are not explicitly called out in FIG. 8, only for ease of illustration purposes. However, logical zones 64 are differentiated visually using the same border scheme used in FIG. 7. More specifically, any of entries 62 illustrated with a solid-line border belongs to logical zone 64a, any of entries 62 illustrated with a dashed-line border belongs to logical zone 64b, and any of entries 62 illustrated with a dotted-line border belongs to logical zone 64c. As shown, the first entry (62a) of zoned L2P table 62 belongs to logical zone 64a, the second entry (62b) belongs to logical zone 64b, and the third entry (62c) belongs to logical zone 64c. Beginning at the fourth entry 62d (which belongs to logical zone 62a, the same logical zone as the first entry 62a), the logical zone assignment repeats itself. Thus, according to the interleaved zoning implementation, logical zoning module 26 may identify logical zones 64 such that no two consecutive entries of entries 62 are included in the same logical zone. In accordance with the interleaved implementation of the techniques of this disclosure, each logical zone may correspond to a group of LBNs that are equally spaced from one another.

From a logical indexing perspective, logical zoning module 26 may assign entries 62 to logical zones 64 by performing a modulo (or "mod") operation using the LBN index and the total number of zones as the two operands. In turn, logical zoning module 26 may determine that all of entries 62 that produce a particular result (remainder) from the mod operation belong to a single logical zone of logical zones 64.

Continuing with the three-zone example discussed with respect to FIG. 7, logical zoning module 26 may perform a respective modulo operation using the LBN index of each of entries 62 and a value of three. As such, logical zoning module 26 may perform the operation 0% 3 for entry 62a, the operation 1% 3 for entry 62b, the operation 2% 3 for entry 62c, the operation 3% 3 for entry 62d, and so on. Thus, logical zoning module 26 may obtain resulting values of zero (0) for entries 62a, 62d, and 62g. Logical zoning module 26 may obtain resulting values of one (1) for entries 62b, 62e, and 62h. Logical zoning module 26 may obtain resulting values of two (2) for entries 62c, 62f, and 62i. Based on the results of the mod operations, logical zoning module 26 may identify logical zone 64a as including entries 62a, 62d, and 62g. Similarly, logical zoning module 26 may identify logical zone 64b as including entries 62b, 62e, and 62h, and may identify logical zone 64c as including entries 62c, 62f, and 62i. In turn, journaling module 31 may form and maintain a separate log list for each of logical zones 64 in the same manner described above with respect to the serial implementation.

By implementing the interleaved implementation of logical zoning according to the techniques described herein, logical zoning module 31 (and thereby, journaling module 31) may provide one or more potential advantages. For instance, the interleaved implementation may enable controller S to use a hot-warm-cold or hot-warm-cool-cold access pattern when accessing non-volatile memory array 10. As used herein, the terms "hot," "warm," "cool," and "cold" refer to the frequency with which data stored at a particular portion of non-volatile memory array 10 is accessed. Controller 8 may leverage the interleaved zoning techniques described herein to spread out access of portions of non-volatile memory array 10 more evenly. In other words, controller 8 may access and use the various memory devices 16a in a less localized or locally-intensive manner.

In some instances, logical zoning module 26 may be configured to perform the serial logical zoning scheme in all scenarios. In other examples, logical zoning module 26 may be configured to perform the interleaved logical zoning scheme in all scenarios. In still other examples, logical zoning module 26 may use both of the serial and interleaved logical zoning schemes, such as by selecting from the two schemes on a case-by-case basis. In this manner, logical zoning module 26 may implement the L2P table zoning techniques of this disclosure in a variety of ways to improve the startup performance of storage device 6 and provide various advantages to the operation of storage device 6.

While both FIGS. 7 and 8 are illustrated and described with respect to three-zone schemes for ease of illustration and discussion, it will be appreciated that, in practice, the number of logical zones can be any number selected as a suitable configuration. The logical zoning and parallelized journaling techniques of this disclosure are scalable, in that the techniques can be scaled up or scaled out, as the capacity of non-volatile memory array 10 increases. As used herein, "scaling up" refers to adding more storage capacity to non-volatile memory array 10 without adding controller infrastructure to controller 8. As used herein, "scaling out" refers to adding more storage capacity to non-volatile memory array 10 accompanied by adding more controller infrastructure to controller 8. As an illustration, typical storage capacities have increased from approximately 62 GB to approximately 4 TB, with further increases being possible and even probable. As such, the scalability of the logical zoning and parallelized journaling techniques of this disclosure represent enhancements that can be applied to widely-varying storage capacities.

Figure 9:
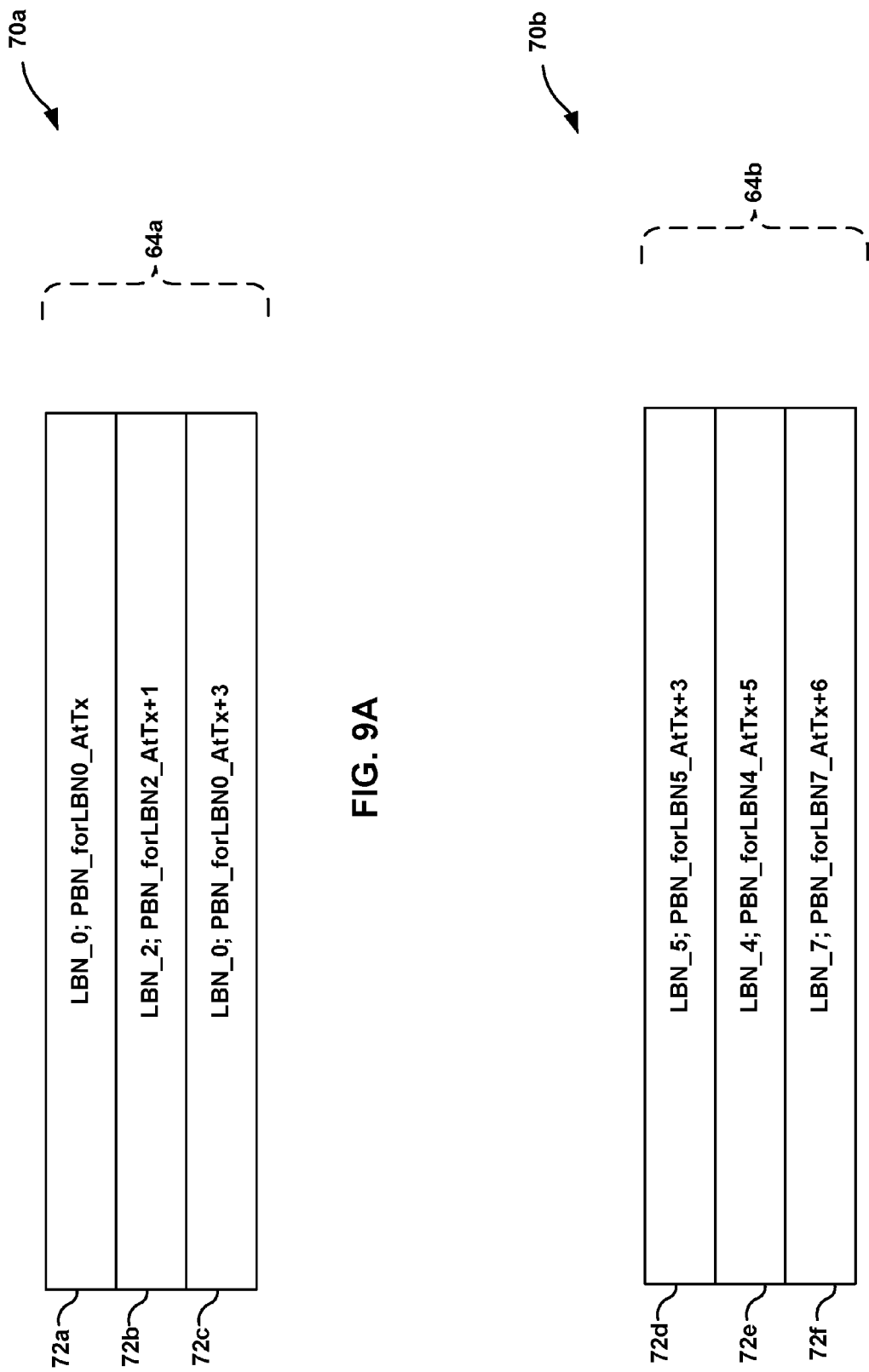
FIGS. 9A and 9B illustrate examples of zone-specific log lists that a device may maintain, in accordance with various aspects of this disclosure.

FIGS. 9A and 9B illustrate examples of zone-specific log lists 70*a* and 70*b* that journaling module 31 may maintain in accordance with various aspects of this disclosure. Zone specific log lists 70*a* and 70*b* correspond to the logical zoning scheme illustrated in FIG. 7. More specifically, journaling module 31 may form and maintain zone-specific log lists 70*a* and 70*b* in an instance where logical zoning module 26 uses a serial logical zoning scheme to identify zones within an L2P table. The specific examples of zone-specific log lists 70*a* and 70*b* correspond, respectively, to zones 64*a* and 64*b* illustrated with respect to zoned L2P table 60 illustrated in FIG. 7. Zone identifiers for logical zones 64*a* and 64*b* are illustrated using dashed lines in FIGS. 9A and 9B to indicate that logical zones 64*a* and 64*b* pertain to an L2P table (namely, logically zoned L2P table 60), and as such, do not represent any zoning or identification within either of zone-specific log lists 70*a* or 70*b*.

As shown in FIG. 9A, zone-specific log list 70*a* includes entries 72*a*-72*c*, which correspond only to LBNs that fall within the logical indexes included in logical zone 64*a*. More specifically, all of entries 72*a*-72*c* of zone-specific log list 70*a* pertains to one of LBN_0, LBN_1, LBN_2, or LBN_3. In the specific example of FIG. 9A, zone-specific log list 70*a*, there are two mapping updates entered for LBN_0, and one mapping update entered for LBN_2. As shown, entries 72*a*-72*c* are appended in chronological order, starting from timestamp $T_x$, and going through timestamp $T_{x+3}$. If and when journaling module 31 detects subsequent mapping changes within logical zone 64*a*, journaling module 31 may append additional entries to zone-specific log list 70*a*. The specific example of zone-specific log list 70*a* does not include any entries for LBN_1 or for LBN_3, which are both included in logical zone 64*a*. However, journaling module 31 may append entries pertaining to these LBN indexes, if and when journaling module 31 detects PBN mapping changes for these LBN indexes.

As shown in FIG. 9B, zone-specific log list 70*b* includes entries 72*d*-72*f*, all of which pertain to LBN indexes within logical zone 64*b*. More specifically, all of entries 72*d*-72*f* of zone-specific log list 70*b* pertains to one of LBN_4, LBN_5, LBN_6, or LBN_7. Controller 8 may implement the techniques of this disclosure to replay zone-specific log lists 72 in parallel. For instance, controller 8 may leverage multi-core processing capabilities available via host 4 to replay portions of zone-specific log lists 72 concurrently, in order to reconstruct zoned L2P table 60. In comparison to existing log list replay technology, the techniques of this disclosure enable controller 8 to concurrently implement two or more updates to zone L2P table 60. By parallelizing the replay of zone-specific log lists 72, controller 8 may implement the techniques of this disclosure to speed up the process of table reconstruction at any power-up of storage device 6. Moreover, controller 8 may spread computing resource consumption more evenly across multiple processing cores, thereby mitigating the physical and logical burdens on any given core at a given time.

Figure 10:
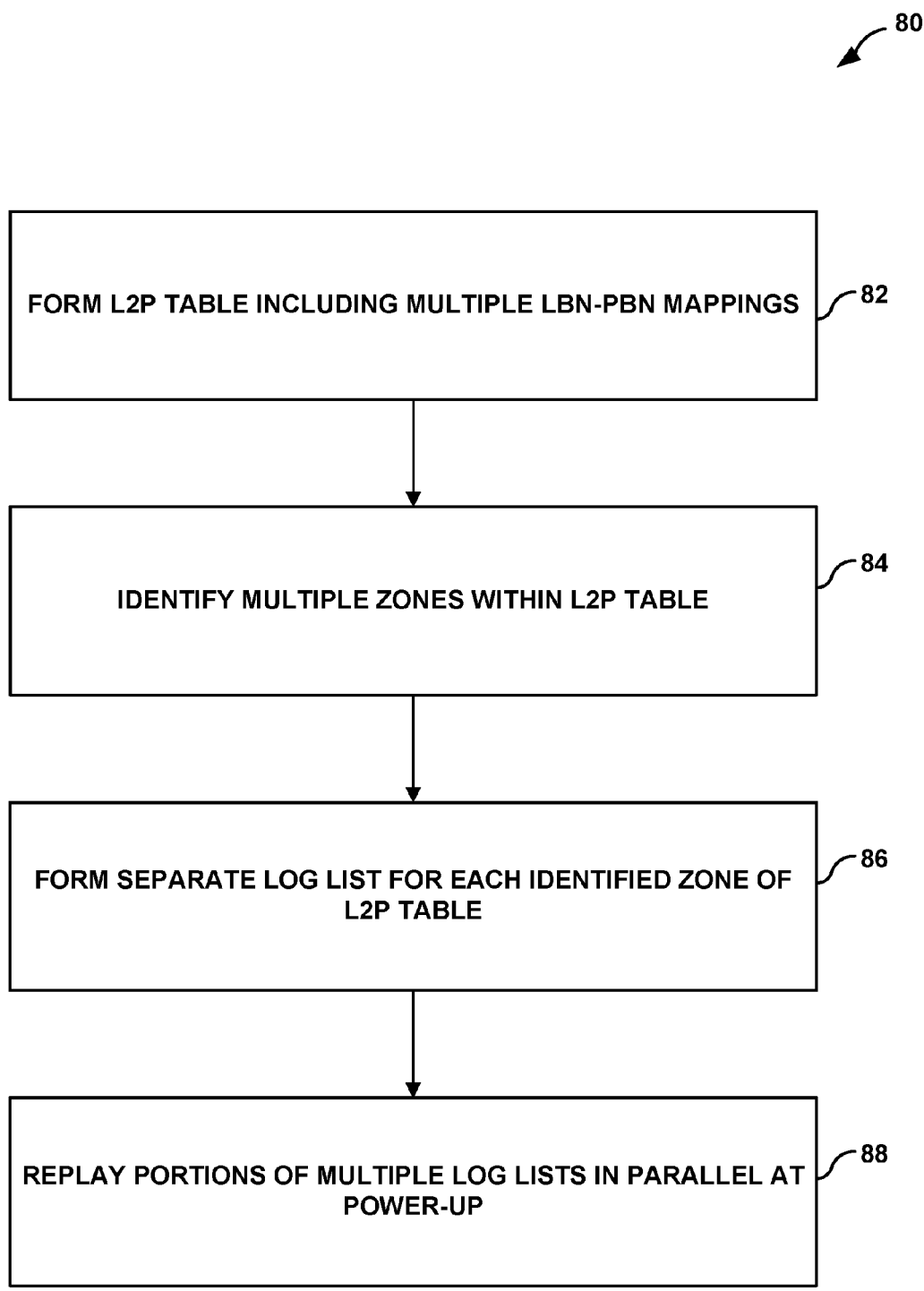
FIG. 10 is a flowchart illustrating an example process that a device may perform to implement one or more aspects of this disclosure.

FIG. 10 is a flowchart illustrating an example process 80 that a device may perform to implement one or more aspects of this disclosure. Although a variety of devices may perform process 80 and steps relevant thereto, process 80 is described herein as being performed by controller 8 and one or more of its components, as a non-limiting example. Various steps are described as being performed on non-volatile memory array 10. Process 80 may begin when controller 8 forms an L2P table that includes multiple LBN-to-PBN mappings (82). For instance, address translation module 22 may form the L2P table such that the table two or more mappings, each mapping being associated with a respective logical address and a respective physical address. In turn, logical zoning module 26 may identify multiple zones within the L2P table (84). In one simplified example, logical zoning module 26 may identify a first zone within the table and a second zone within the table, where each of the first zone and second zone includes one or more mappings of the table, and where the first zone and the second zone do not share any mapping of the two or more mappings of the table. The first logical zone and the second logical zone may be included in a plurality of logical zones identified by logical zoning module 26. In various implementations, logical zoning module 26 may identify the plurality of logical zones using the serial zoning scheme, the interleaved zoning scheme, or any combination thereof. The mappings included in the first logical zone may be mutually exclusive with respect to the mappings included in the second logical zone. Thus, the first and second logical zones do not share any mapping of the various mappings included in the L2P table. In other words, no two logical zones overlap.

Additionally, journaling module 31 may form a separate log list for each identified zone of the L2P table (86). For instance, journaling module 31 may form a first log list associated with the first zone, the first log list indicating one or more mapping updates associated with the one or more mappings included in the first zone. In this example, journaling module 31 may form a second log list associated with the second zone, the second log list indicating one or more mapping updates associated with the one or more mappings included in the second zone. In accordance with the aspects of this disclosure, journaling module 31 may replay portions of the multiple log lists in parallel at power-up of storage device 6 (88). For instance, journaling module 31 may replay a portion of the first log list and a portion of the second log list concurrently to update the table. For instance, journaling module 31 may draw upon multiple processors or multiple cores of a single processor to parallelize the replay of zone-specific log lists 70*a* and 70*h* concurrently. It will be appreciated that journaling module 31 may parallelize the entirety of some log lists, portions of some log lists, or perform any combination thereof. In other words, journaling module 31 may or may not replay multiple log lists at every instance of time, and journaling module 31 may replay different numbers of log lists at any given time, in accordance with the aspects of this disclosure.

Although the foregoing examples have been described with respect to a controller of a storage device, in other scenarios, the examples described herein may be implemented by another processor, such as a general purpose processor, and the logical to physical data address translation table may be, for example, a translation lookaside buffer.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors; to implement one or more of the techniques described herein, such as when instructions included or encoded in the computer-readable storage medium are executed by the one or more processors. Computer readable storage media may include random access memory (RAM), read only memory (RUM), programmable read only memory (PROM), erasable programmable read only memory (EPROM), electronically erasable programmable read only memory (EEPROM), flash memory; a hard disk, a compact disc RUM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples; a non-transitory storage medium may store data that can, over time, change (e.g., in RAM or cache).

Various examples have been described. These and other examples are within the scope of the following claims.

What is claimed is:

1. A method comprising:
   forming, by a processor, a table that includes two or more mappings, each mapping being associated with a respective logical address and a respective physical address of a data storage device;
   identifying, by the processor, a plurality of logical zones including a first logical zone within the table and a second logical zone within the table,
   wherein each of the first logical zone and the second logical zone includes one or more mappings of the table, and
   wherein the one or more mappings of the first logical zone are mutually exclusive with respect to the one or more mappings of the second logical zone;
   forming, by the processor, a first log list associated with the first logical zone, the first log list indicating one or more mapping updates associated with the one or more mappings included in the first logical zone;
   forming, by the processor, a second log list associated with the second logical zone, the second log list indicating one or more mapping updates associated with the one or more mappings included in the second logical zone; and
   replaying, by the processor, a portion of the first log list and a portion of the second log list concurrently to update the table.

2. The method of claim 1,
   wherein a controller of the data storage device comprises the processor, and
   wherein replaying the portion of the first log list and the portion of the second log list is responsive to detecting, by the controller, a power-up of the data storage device.

3. The method of claim 1, wherein identifying the first logical zone and the second logical zone comprises:
   determining, by the processor, that a first subset of the two or more mappings is associated with a first group of logical addresses;
   determining, by the processor, that a second subset of the two or more mappings is associated with a second, different group of logical addresses;
   assigning, by the processor, the first subset to the first logical zone; and
   assigning, by the processor, the second subset to the second logical zone.

4. The method of claim 3, further comprising:
   identifying, by the processor, the first group of logical addresses based on the first group of logical addresses representing a consecutive block of logical addresses.

5. The method of claim 4, further comprising:
   determining, by the processor, a total number of logical zones to be identified within the table; and
   determining, by the processor, a total number of logical addresses to include in the first subset based on a total number of entries in the table and the total number of logical zones to be identified within the table.

6. The method of claim 3, further comprising:
   identifying, by the processor, the first group of logical addresses based on a respective index of each logical address in the first group producing an equal remainder when divided by a total number of logical zones to be identified within the table.

7. The method of claim 1, wherein replaying the portion of the first log list and the portion of the second log list concurrently comprises:

replaying, by a first processor core, the portion of the first log list; and replaying, by a second processor core, the portion of the second log list.

8. The method of claim 1, further comprising determining, by the processor, a total number of logical zones to be identified in the table such that the total number of logical zones is based on a total number of processing cores associated with the processor.

9. The method of claim 1, wherein forming the first log list comprises journaling, by the processor, the one or more mapping updates associated with the one or more mappings included in the first logical zone in a chronological order.

10. A device comprising:
a memory device configured to store a table that includes two or more mappings, each mapping being associated with a respective logical address and a respective physical address of a data storage device; and
one or more processors configured to:
identify a plurality of logical zones including a first logical zone within the table and a second logical zone within the table,
wherein each of the first logical zone and second logical zone includes one or more mappings of the table, and
wherein the one or more mappings of the first logical zone are mutually exclusive with respect to the one or more mappings of the second logical zone;
form a first log list associated with the first logical zone, the first log list indicating one or more mapping updates associated with the one or more mappings included in the first logical zone;
form a second log list associated with the second logical zone, the second log list indicating one or more mapping updates associated with the one or more mappings included in the second logical zone; and
replay a portion of the first log list and a portion of the second log list concurrently to update the table.

11. The device of claim 10,
wherein a controller of the data storage device comprises the one or more processors,
wherein the memory device comprises a non-volatile memory array of the data storage device, and
wherein to replay the portion of the first log list and the portion of the second log list, the controller is configured to replay the portion of the first log list and the portion of the second log list in response to a detection of a power-up of the data storage device.

12. The device of claim 10, wherein to identify the first logical zone and the second logical zone, the one or more processors are configured to:
determine that a first subset of the two or more mappings is associated with a first group of logical addresses;
determine that a second subset of the two or more mappings is associated with a second, different group of logical addresses;
assign the first subset to the first logical zone; and
assign the second subset to the second logical zone.

13. The device of claim 12, wherein the one or more processors are further configured to identify the first group of logical addresses based on the first group of logical addresses representing a consecutive block of logical addresses.

14. The device of claim 13, wherein the one or more processors are further configured to:
determine a total number of logical zones to be identified within the table; and
determine a total number of logical addresses to include in the first subset based on a total number of entries in the table and the total number of logical zones to be identified within the table.

15. The device of claim 12, wherein the one or more processors are further configured to identify the first group of logical addresses based on a respective index of each logical address in the first group producing an equal remainder when divided by a total number of logical zones to be identified within the table.

16. The device of claim 10, wherein to replay the portion of the first log list and the portion of the second log list concurrently, the one or more processors are configured to:
replay, by a first processor core, the portion of the first log list; and
replay, by a second processor core, the portion of the second log list.

17. The device of claim 10, wherein the one or more processors are further configured to determine a total number of logical zones to be identified in the table such that the total number of zones is based on a total number of processing cores associated with the processor.

18. The device of claim 10, wherein to form the first log list, the one or more processors are configured to journal the one or more mapping updates associated with the one or more mappings included in the first logical zone in a chronological order.

19. The device of claim 10, wherein the data storage device comprises a solid state drive (SSD).

20. A non-transitory computer-readable storage medium encoded with instructions that, when executed, cause one or more processors of a computing device to:
form a table that includes two or more mappings, each mapping being associated with a respective logical address and a respective physical address of a data storage device;
identify a plurality of logical zones including a first logical zone within the table and a second logical zone within the table,
wherein each of the first logical zone and second logical zone includes one or more mappings of the table, and
wherein the one or more mappings of the first logical zone are mutually exclusive with respect to the one or more mappings of the second logical zone;
form a first log list associated with the first logical zone, the first log list indicating one or more mapping updates associated with the one or more mappings included in the first logical zone;
form a second log list associated with the second logical zone, the second log list indicating one or more mapping updates associated with the one or more mappings included in the second logical zone; and
replay a portion of the first log list and a portion of the second log list concurrently to update the table.

* * * * *